US008312856B2

(12) United States Patent
Yamagata et al.

(10) Patent No.: US 8,312,856 B2
(45) Date of Patent: Nov. 20, 2012

(54) FORGED PISTON, INTERNAL COMBUSTION ENGINE, TRANSPORTATION APPARATUS AND METHOD OF MAKING THE FORGED PISTON

(75) Inventors: Hiroshi Yamagata, Shizuoka (JP); Hirotaka Kurita, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 1054 days.

(21) Appl. No.: 11/766,852

(22) Filed: Jun. 22, 2007

(65) Prior Publication Data

US 2008/0010828 A1 Jan. 17, 2008

(30) Foreign Application Priority Data

Jul. 13, 2006 (JP) ................................ 2006-192870

(51) Int. Cl.
*B21D 22/00* (2006.01)
*B23P 15/10* (2006.01)
*F02F 3/00* (2006.01)

(52) U.S. Cl. .................... 123/193.6; 29/888.04; 72/352

(58) Field of Classification Search ............... 29/888.04, 29/888.042, 888.044; 92/173, 208, 213, 92/224, 222, 233; 72/64, 255, 311, 371, 72/352, 356, 267, 259, 260; 123/193.6; 164/DIG. 8; 420/402, 407, 417, 528
See application file for complete search history.

(56) References Cited

U.S. PATENT DOCUMENTS

| | | | | |
|---|---|---|---|---|
| 2,465,792 | A * | 3/1949 | Davis | 92/208 |
| 2,795,467 | A * | 6/1957 | Colwell | 92/222 |
| 3,070,414 | A * | 12/1962 | Wilcoxon | 92/222 |
| 3,654,840 | A * | 4/1972 | Elliott | 92/222 |
| 3,945,463 | A * | 3/1976 | Okano et al. | 184/6.13 |
| 4,867,119 | A * | 9/1989 | Cooper et al. | 123/193.6 |
| RE34,139 | E * | 12/1992 | Cooper et al. | 123/193.6 |
| 5,972,071 | A * | 10/1999 | Koike et al. | 75/255 |
| 6,209,446 | B1 * | 4/2001 | Kurita et al. | 92/224 |

FOREIGN PATENT DOCUMENTS

| | | | |
|---|---|---|---|
| JP | 56-136216 | A | 10/1981 |
| JP | 11-182641 | A | 7/1999 |
| JP | 11-347605 | A | 12/1999 |
| JP | 2000-39067 | A | 2/2000 |
| JP | 2000-179399 | A | 6/2000 |
| JP | 2003-343672 | A | 12/2003 |
| JP | 2004-98112 | A | 4/2004 |
| JP | 2006-110621 | A | 4/2006 |

OTHER PUBLICATIONS

Official Communication issued in corresponding Japanese Patent Application No. 2007-153509, mailed on Oct. 18, 2011.

* cited by examiner

*Primary Examiner* — Alexander P Taousakis
(74) *Attorney, Agent, or Firm* — Keating & Bennett, LLP

(57) ABSTRACT

A method of making a forged piston includes the steps of providing a workpiece made of an aluminum alloy, a magnesium alloy or a titanium alloy; and forging the workpiece with stress applied thereto in a predetermined direction (forging direction). The method further includes, before the step of forging, the step of working the workpiece such that fiber flows of the workpiece are nonparallel to the predetermined direction.

7 Claims, 12 Drawing Sheets

FORGED PISTON, INTERNAL COMBUSTION ENGINE, TRANSPORTATION APPARATUS AND METHOD OF MAKING THE FORGED PISTON

BACKGROUND OF THE INVENTION

1. Field of the Invention

The present invention relates to a forged piston formed by forging a metallic material and a method of making such a piston, and also relates to an internal combustion engine and a transportation apparatus including such a forged piston.

2. Description of the Related Art

Recently, a forged piston, formed by a forging process, has been adopted more and more often as a piston for an internal combustion engine. The forged piston has excellent mechanical strength and abrasion resistance at high temperatures. That is why if a forged piston is adopted, the output can be increased by increasing the explosion pressure and the weight can be decreased by reducing the size (or the thickness) of the piston skirt.

For example, Japanese Laid-Open Patent Publication No. 2000-179399 discloses a forged piston made of an aluminum alloy. FIGS. 14A and 14B are respectively a top view and a side view schematically illustrating the forged piston 510 disclosed in Japanese Laid-Open Patent Publication No. 2000-179399, supra.

As shown in FIG. 14A, this forged piston 510 has a piston head 510 with fiber flows f extending radially. That is to say, these fiber flows f are parallel to the radial direction. The fiber flows f are also called "metal flows" or "flow lines", which are the traces of metal structure flows as is often seen in a forged product. Also, as shown in FIG. 14B, the piston skirt 505 has fiber flows f extending parallel to the sliding direction.

In the forged piston 510 disclosed in Japanese Laid-Open Patent Publication No. 2000-179399, however, the fiber flows f of the piston head 501 extend parallel to the radial direction as shown in FIG. 14A. That is why if the weight were further reduced to improve the performance of the internal combustion engine, the piston could have insufficient endurance strength with respect to the bending stress applied either parallel or perpendicularly to the piston pin under explosion pressure. The reason why the bending stress is applied in those directions will be described with reference to FIGS. 15A and 15B.

As shown in FIG. 15A, the explosion pressure itself, caused by combustion, is applied isotropically to the piston head 501. However, the piston 510 has a thickened portion 503 (which is called a "piston boss") defining a bearing for the piston pin as shown in FIGS. 15A and 15B.

For that reason, in a cross section of the piston 510 as viewed on a plane that includes the center axis of the piston 510 and that is parallel to the piston pin (i.e., a cross section including both the thickened portion and the thinner portion), bending stress is produced so as to press down the center portion, which is thinner than the piston boss 503 as shown in FIGS. 16A and 16B.

When such bending stress is produced to depress the center portion on a cross section as viewed parallel to the piston pin, bending stress that depresses the center portion is also produced on a cross section as viewed perpendicularly to the piston pin as shown in FIGS. 17A and 17B.

The present inventors discovered and confirmed via experiments that, if the weight of the piston 510 were further reduced, the piston head 501 with those radially extending fiber flows f might have insufficient strength with respect to the bending stress applied in those directions.

The same statement also applies to the piston skirt 505 that often has its thickness reduced to make the piston 510 even more lightweight. Specifically, in that case, if the fiber flows f extend parallel to the sliding direction of the piston 510 as shown in FIG. 14B, the endurance strength of the piston 510 could also be insufficient to endure the fatigue caused by repetitively applied impacts.

SUMMARY OF THE INVENTION

In order to overcome the problems described above, preferred embodiments of the present invention provide a forged piston that has higher strength and fatigue endurance than conventional ones and a method of making such a piston.

A method of making a forged piston according to a preferred embodiment of the present invention includes the steps of providing a workpiece made of an aluminum alloy, a magnesium alloy or a titanium alloy; and forging the workpiece with stress applied thereto in a predetermined direction. The method further includes, before the step of forging, the step of working the workpiece such that fiber flows of the workpiece are nonparallel to the predetermined direction (i.e., the fiber flows are tilted from the predetermined direction and run in a substantially same direction).

In one preferred embodiment of the present invention, the step of working includes twisting the workpiece.

In another preferred embodiment, the workpiece is a bar member formed by a continuous casting or extrusion process.

A forged piston according to a preferred embodiment of the present invention is made of an aluminum alloy, a magnesium alloy or a titanium alloy and includes a piston head, of which the fiber flows are nonparallel to a radial direction (i.e., the fiber flows are tilted from the radial direction in a substantially same manner).

In one preferred embodiment of the present invention, the fiber flows of the piston head have a swirling pattern.

In another preferred embodiment, the forged piston includes a piston wall on which the fiber flows are nonparallel to a sliding direction.

Another forged piston according to the present invention is also made of an aluminum alloy, a magnesium alloy or a titanium alloy and includes a piston wall, on which fiber flows are nonparallel to a sliding direction (i.e., the fiber flows are tilted from the sliding direction in a substantially same manner).

An internal combustion engine according to another preferred embodiment of the present invention includes a forged piston according to any of the preferred embodiments of the present invention described above.

A transportation apparatus according to a further preferred embodiment of the present invention includes an internal combustion engine according to the other preferred embodiments of the present invention described above.

In a forged piston according to a preferred embodiment of the present invention, the fiber flows of the piston head are nonparallel to the radial direction. As a result, the piston has increased strength with respect to the bending stress that is applied parallel to the radial direction (i.e., either parallel or perpendicularly to the piston pin).

In another forged piston according to a preferred embodiment of the present invention, the fiber flows of the piston wall are nonparallel to the sliding direction. Consequently, the piston skirt has increased strength with respect to the bending stress that is applied parallel to the sliding direction and can endure the fatigue more perfectly every time an impact is applied by explosion.

A method of making a forged piston according to a preferred embodiment of the present invention includes, before the step of forging, the step of working a workpiece such that fiber flows of the workpiece are nonparallel to a forging direction (i.e., the direction in which stress is applied in the step of forging). That is why the fiber flows of the resultant forged piston can be nonparallel to either the radial direction or the sliding direction. As a result, a forged piston with high strength and good fatigue endurance can be obtained.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Hereinafter, preferred embodiments of the present invention will be described with reference to the accompanying drawings. In the following description of preferred embodiments, the present invention is preferably applied to a forged piston made of an aluminum alloy. However, the present invention is in no way limited to those specific preferred embodiments but is also effectively applicable to a forged piston made of a magnesium alloy or a titanium alloy.

Figure 1:
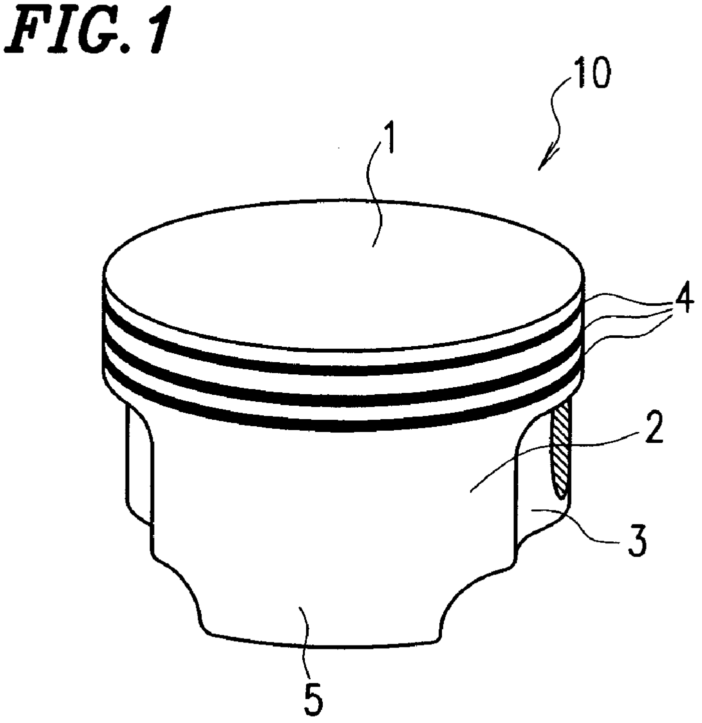
FIG. 1 is a perspective view schematically illustrating a forged piston according to a preferred embodiment of the present invention.

FIG. 1 schematically illustrates a forged piston 10 according to a preferred embodiment of the present invention. The forged piston 10 is preferably made of an aluminum alloy, for example. An aluminum alloy including silicon has such high strength and high abrasion resistance as to be used effectively as a material for the forged piston 10.

The forged piston 10 includes a piston head 1, which is located at the top so as to face a combustion chamber, and a piston wall 2, which is sometimes called a "piston sidewall" and which defines a sliding surface that contacts with a cylinder block. The forged piston 10 further includes a piston boss 3 as a bearing for a piston pin.

On the upper portion of the piston wall 2 that is located closer to the piston head 1, grooves 4 have been cut so as to retain either a compression ring or an oil ring. The lower portion 5 of the piston wall 2 that is located under the piston pin has a reduced thickness to decrease the overall weight of the piston and is often called a "piston skirt".

Figure 2:
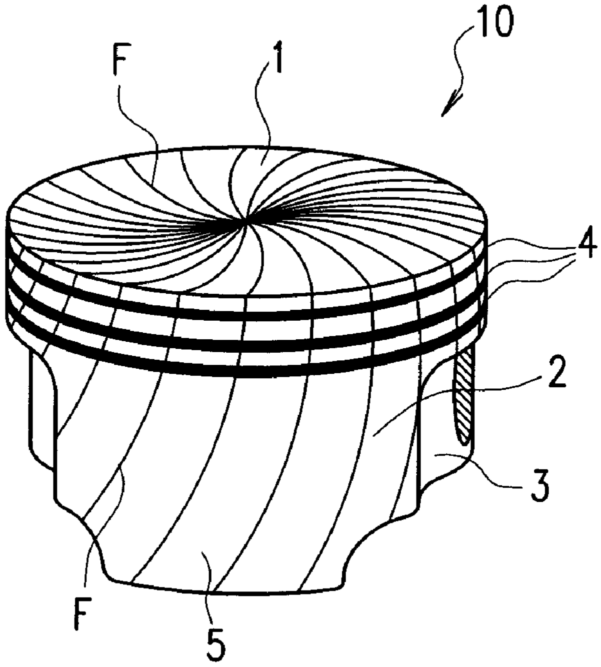
FIG. 2 is a perspective view schematically illustrating a forged piston according to a preferred embodiment of the present invention.
Figure 3A:
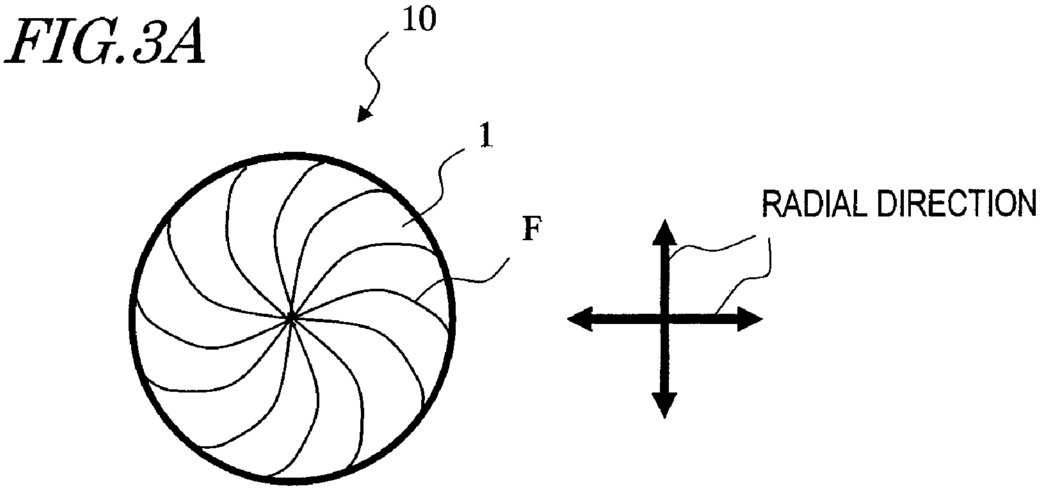
FIGS. 3A and 3B are respectively a top view and a side view schematically illustrating a forged piston according to a preferred embodiment of the present invention.
Figure 3B:
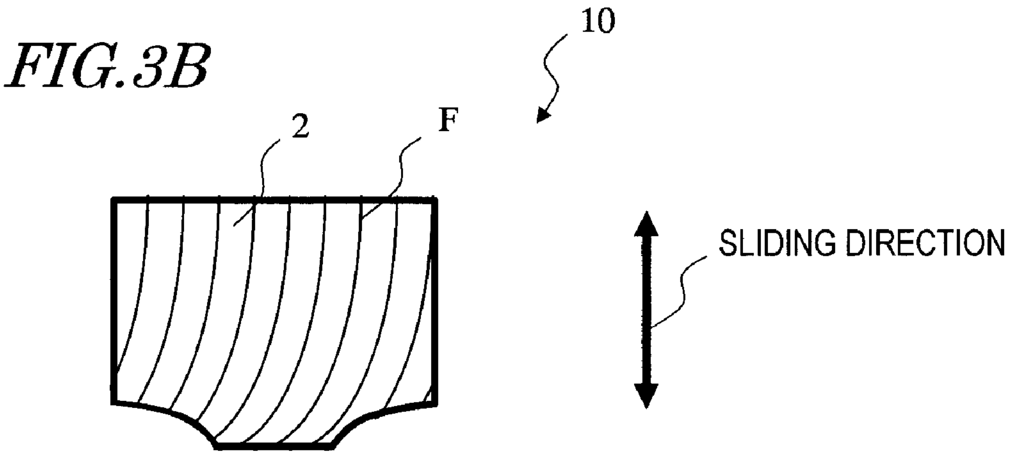

The forged piston 10 of this preferred embodiment is characterized by the direction in which the fiber flows extend. FIGS. 2, 3A and 3B are respectively a perspective view, a top view and a side view schematically illustrating the fiber flows F of the forged piston 10. It should be noted that the fiber flows F are illustrated in these drawings just schematically and selectively among an actually uncountable number of flow lines.

As shown in FIGS. 2 and 3A, when viewed from over the forged piston 10 (i.e., from the combustion chamber), the fiber flows F of the piston head 1 are nonparallel to, and intersect with, the radial direction (i.e., the direction that is defined so as to point outward from the center of the piston head 1). More specifically, the fiber flows F are not straight but preferably are curved and have a swirling pattern that is defined around the center axis of the forged piston 10. Also, as shown in FIGS. 2 and 3B, the fiber flows F of the piston wall 2 are nonparallel to, and intersect with, the sliding direction (i.e., the direction in which the forged piston 10 reciprocates in the cylinder).

As described above, the fiber flows F are metal structure flows of a forged product. That is why it is difficult to fracture a forged product across the fiber flows F. In other words, the greater the number of fiber flows F that intersect with a cross section that has been taken in a certain direction, the more perfectly the forged product can endure the bending stress applied in that direction.

Figure 14A:
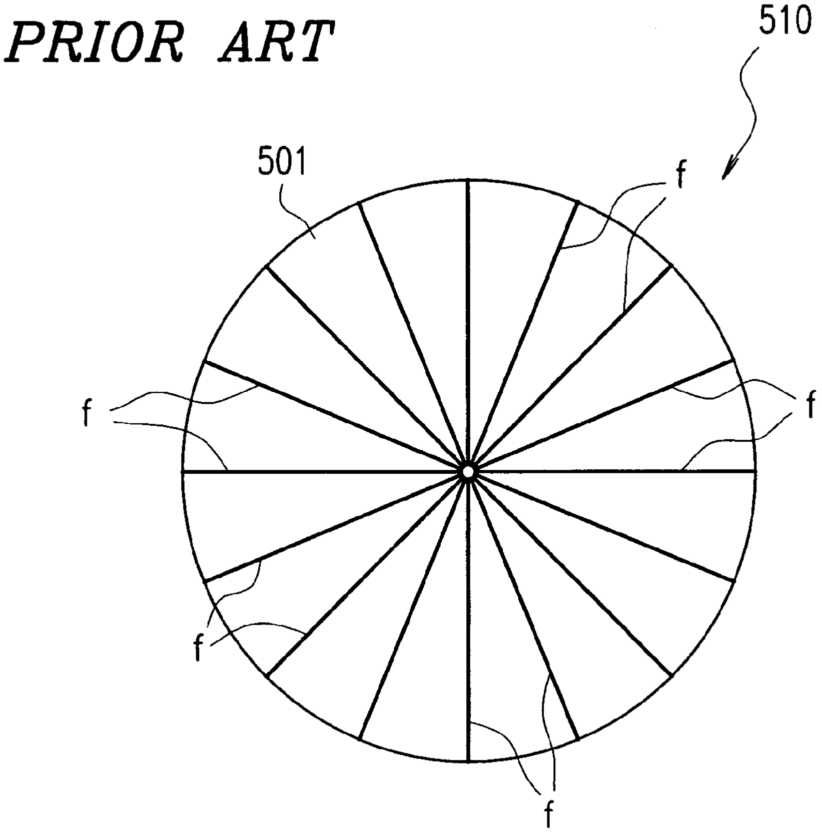
FIG. 14A PRIOR ART
FIGS. 14A and 14B are respectively a top view and a side view schematically illustrating a conventional forged piston.

In the forged piston 10 of this preferred embodiment, the fiber flows F of the piston head 1 intersect with the radial direction. That is why compared to the situation where the fiber flows f are parallel to the radial direction as shown in FIG. 14A, a greater number of fiber flows F intersect with a cross section that has been taken parallel to the radial direction. Supposing a cross section is taken either parallel to, or perpendicularly to, the piston pin, for example, a greater number of fiber flows F intersect with such a cross section, thus increasing the strength with respect to the bending stress that is applied parallel to the radial direction (i.e., either parallel or perpendicularly to the piston pin).

Figure 14B:
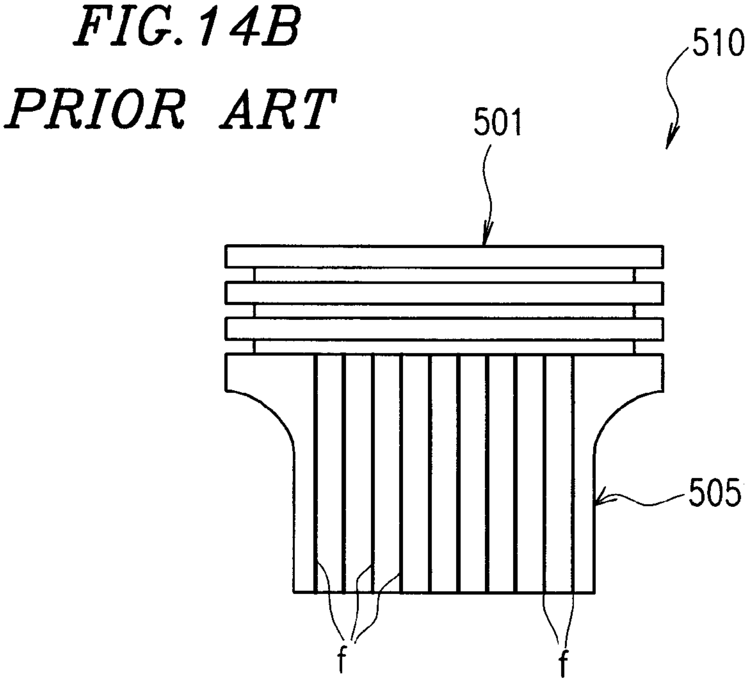
FIG. 14B PRIOR ART
Figure 15A:
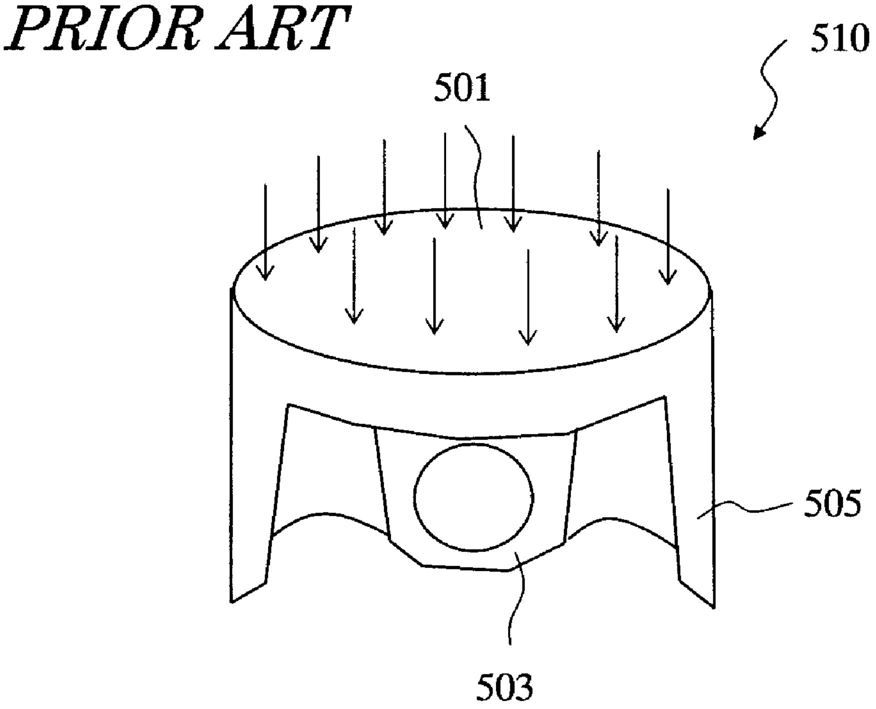
FIG. 15A PRIOR ART
FIGS. 15A and 15B are respectively a perspective view and a top view schematically illustrating a conventional forged piston.
Figure 15B:
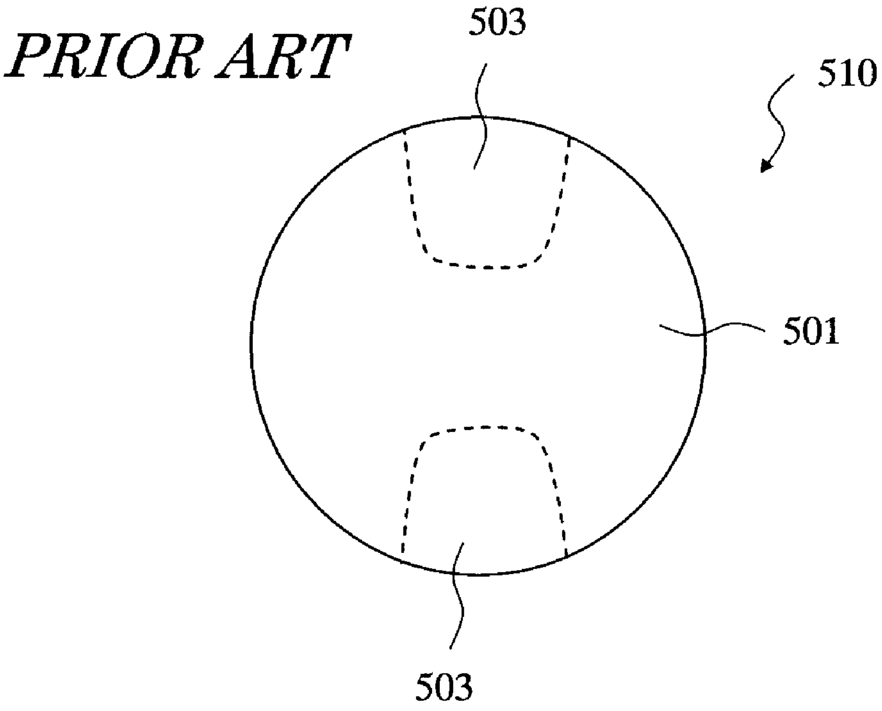
FIG. 15B PRIOR ART
Figure 16A:
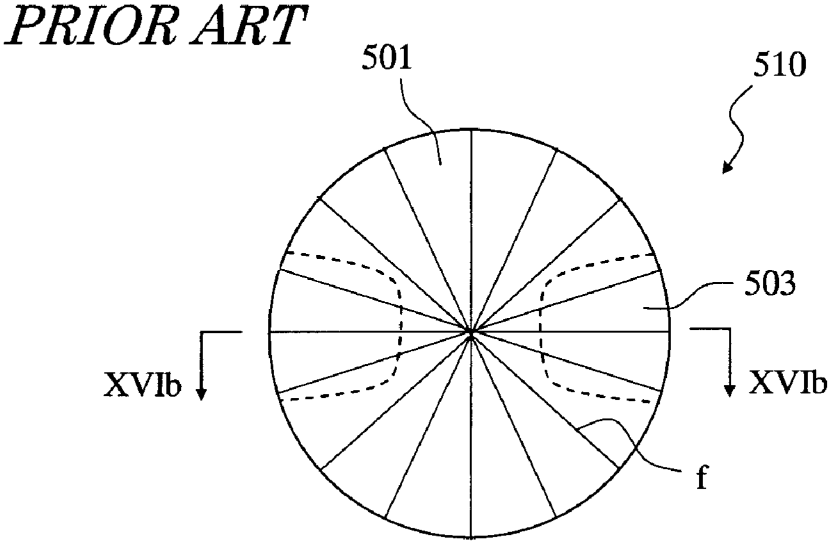
FIG. 16A PRIOR ART
FIGS. 16A and 16B are respectively a top view and a cross-sectional view, as viewed on the plane XVIb-XVIb shown in FIG. 16A, showing how a bending stress is applied parallel to the piston pin.
Figure 16B:
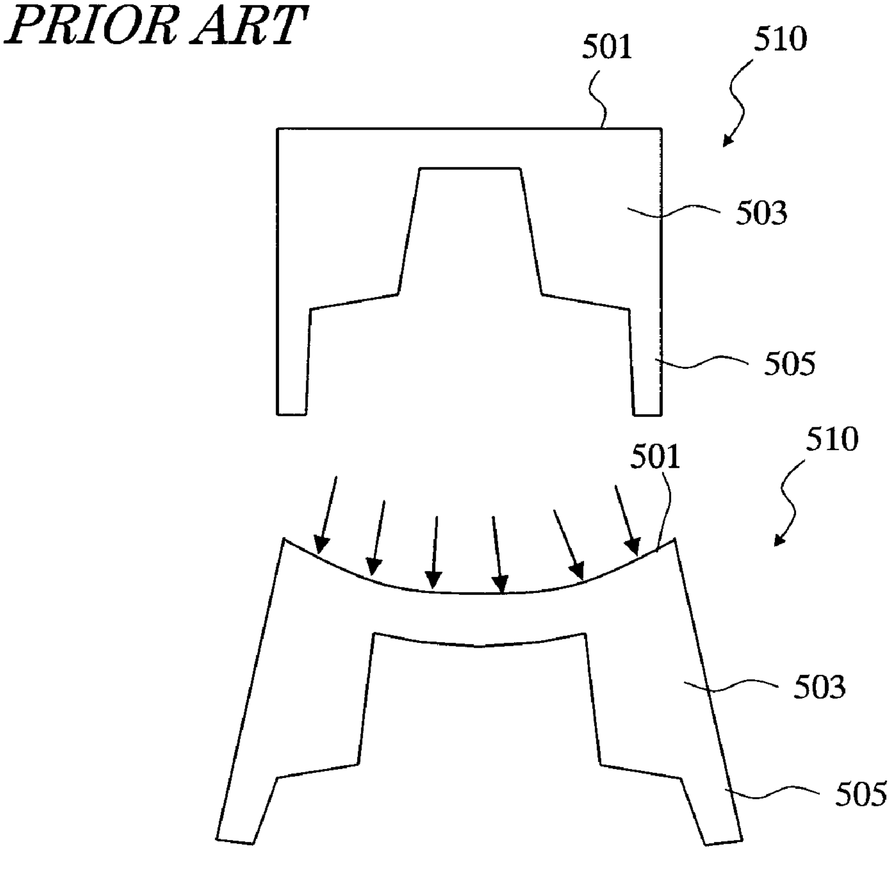
FIG. 16B PRIOR ART
Figure 17A:
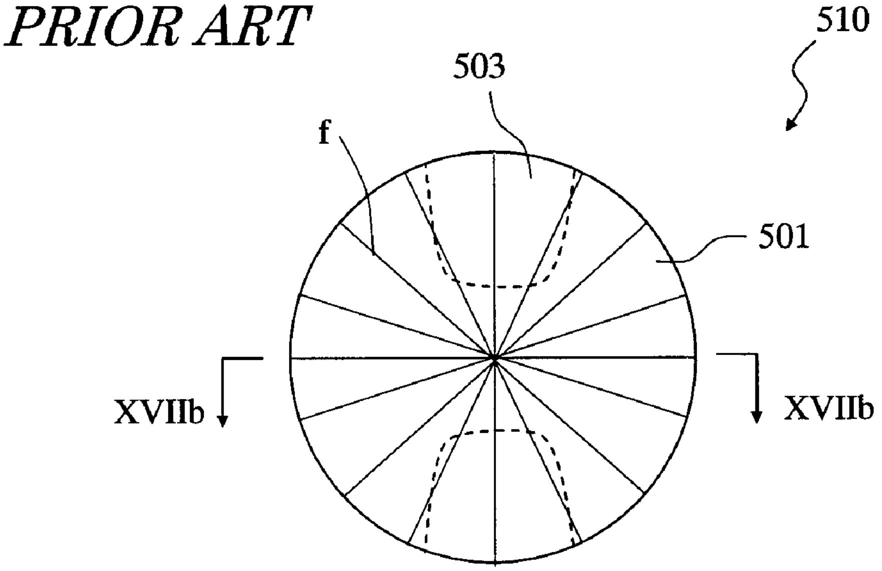
FIG.17A PRIOR ART
FIGS. 17A and 17B are respectively a top view and a cross-sectional view, as viewed on the plane XVIIb-XVIIb shown in FIG. 17A, showing how a bending stress is applied perpendicularly to the piston pin.
Figure 17B:
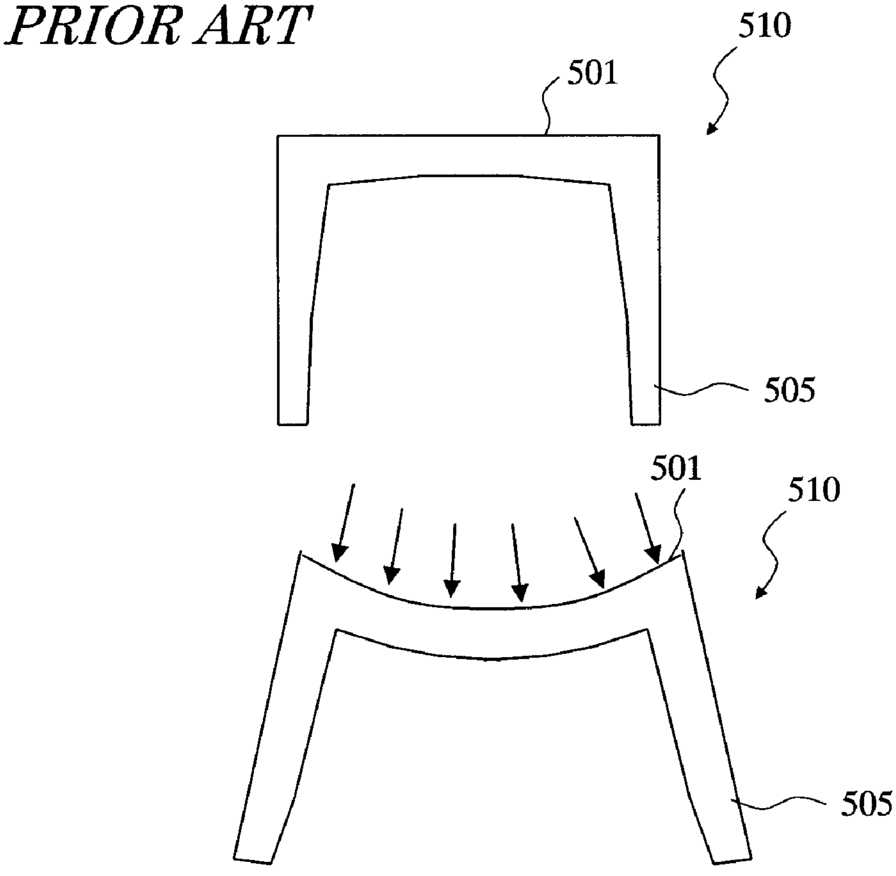
FIG.17B PRIOR ART

Furthermore, in the forged piston 10 of this preferred embodiment, the fiber flows F of the piston wall 2 are nonparallel to the sliding direction. That is why compared to the situation where the fiber flows f are parallel to the sliding direction as shown in FIG. 14B, a greater number of fiber flows F intersect with a cross section that has been taken parallel to the sliding direction. As a result, the piston skirt 5 has increased strength with respect to the bending stress that is applied parallel to the sliding direction and can endure the fatigue more perfectly every time impact is applied by explosion.

As described above, in the forged piston 10 of this preferred embodiment, the fiber flows F are nonparallel to the radial and sliding directions, thus realizing high strength and good fatigue endurance.

It should be noted that the nonparallel pattern of the fiber flows F of the piston head 1 with respect to the radial direction and that of the fiber flows F of the piston wall 2 with respect to the sliding direction are not limited to the examples shown in FIGS. 2, 3A and 3B.

Figure 4:
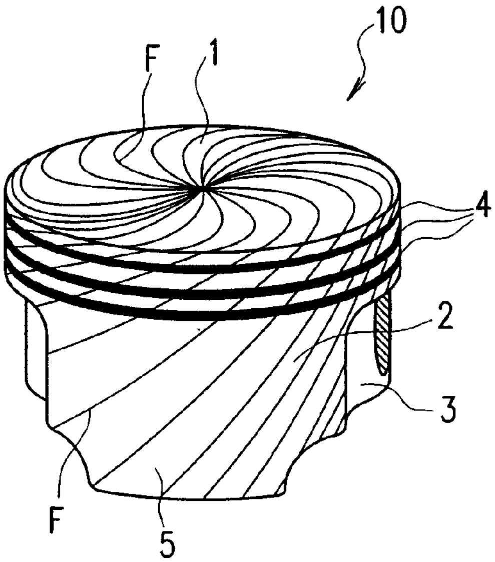
FIG. 4 is a perspective view schematically illustrating a forged piston according to another preferred embodiment of the present invention.
Figure 5:
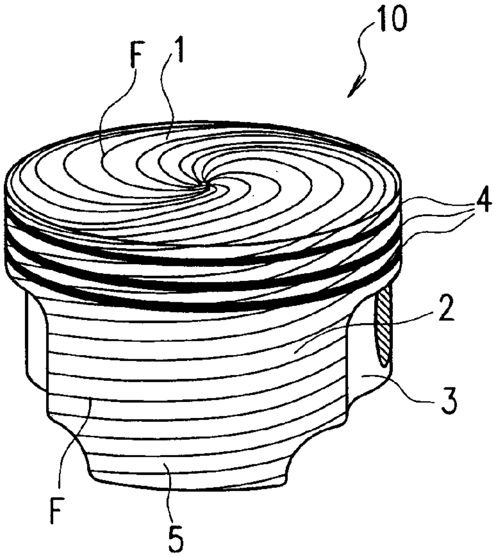
FIG. 5 is a perspective view schematically illustrating a forged piston according to still another preferred embodiment of the present invention.
Figure 6:
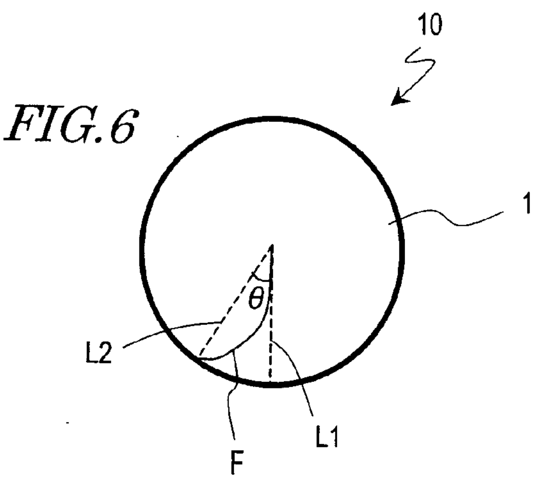
FIG. 6 shows the tilt angle defined by a fiber flow with respect to the radial direction.

For example, the fiber flows F may define a steeper tilt angle with respect to the radial direction or the sliding direction as shown in FIG. 4 or an even steeper tilt angle with respect to the radial or sliding direction as shown in FIG. 5. To maximize the strength and fatigue endurance by increasing the number of fiber flows F intersecting with a cross section that has been taken either in the radial direction or the sliding direction, the fiber flows F preferably define as steep a tilt angle as possible with respect to the radial direction or the sliding direction. That is to say, considering the strength and the fatigue endurance, the example shown in FIG. 4 is more preferred to that shown in FIG. 2 and the example shown in FIG. 5 is even more preferred to that shown in FIG. 4. Specifically, the fiber flows F preferably define a tilt angle of about 10 degrees to less than about 90 degrees with respect to the radial direction or the sliding direction. It should be noted that the tilt angle formed by the fiber flows F with respect to the radial direction is defined as an angle formed between a tangential line L1 that passes the center of the piston head 1 and a line L2 that connects together both ends of a fiber flow F (one end of which is located at the center of the piston head 1 and the other of which is located on the outer periphery) as shown in FIG. 6, for example.

However, if the fiber flows F had too steep a tilt angle, then it could be more difficult to make the forged piston 10 as intended. That is why to make the forged piston 10 as easily as possible, the fiber flows F preferably have a small tilt angle. That is to say, to facilitate the manufacturing process, the example shown in FIG. 4 is more preferred to that shown in FIG. 5 and the example shown in FIG. 2 is even more preferred to that shown in FIG. 4.

Figure 7:
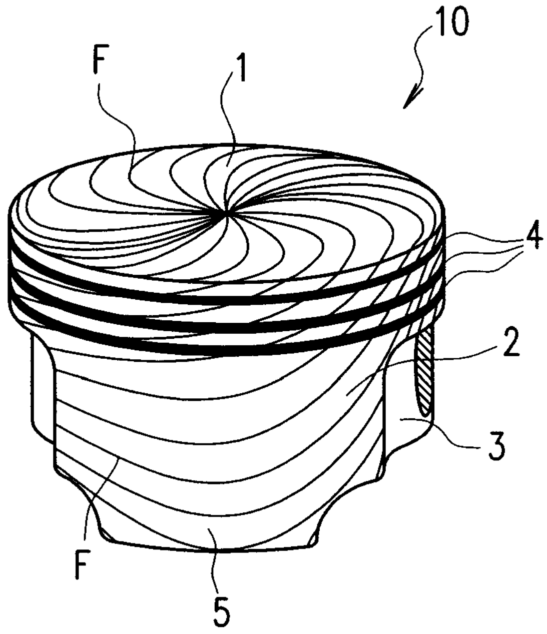
FIG. 7 is a perspective view schematically illustrating a forged piston according to yet another preferred embodiment of the present invention.
Figure 8:
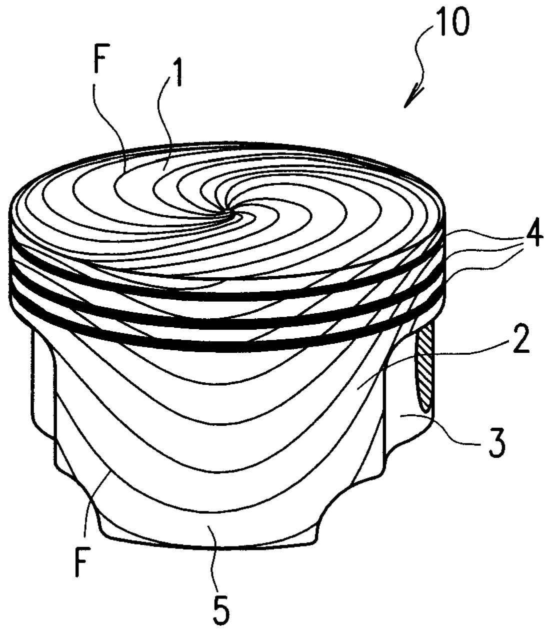
FIG. 8 is a perspective view schematically illustrating a forged piston according to yet another preferred embodiment of the present invention.

FIGS. 7 and 8 illustrate other examples of the fiber flows F. In the examples illustrated in FIGS. 7 and 8, the fiber flows F of the piston wall 2 fall obliquely toward lower left and then rise obliquely toward upper left. Such fiber flows F are also nonparallel to the sliding direction, thus achieving similar effects.

Hereinafter, a method of making the forged piston 10 of this preferred embodiment will be described with reference to FIGS. 9A through 9G, which schematically illustrate the respective manufacturing process steps to make the forged piston 10.

Figure 9A:
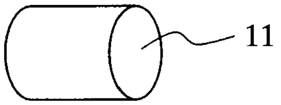
FIGS. 9A through 9G illustrate respective manufacturing process steps to make a forged piston according to a preferred embodiment of the present invention.

First, as shown in FIG. 9A, a workpiece 11 preferably made of an aluminum alloy is provided. As the aluminum alloy, one of Aluminum Alloys A through E having the compositions shown in the following Table 1 may be used, for example. Each of these Aluminum Alloys A through E preferably includes silicon. In Table 1, all numerals represent mass percentages and the balance of the alloy is aluminum. The composition of the aluminum alloy to use is appropriately determined by the property that the forged piston 10 should have.

TABLE 1

| Aluminum alloy | Si | Cu | Mg | Fe | Mn | Cr | Ni | Zn | Zr |
|---|---|---|---|---|---|---|---|---|---|
| A | 0.15 | 2.5 | 1.5 | 1.2 | | | | 0.25 | |
| B | 12.0 | 4.0 | 0.5 | 0.1 | 0.1 | 0.1 | | | |
| C | 17 | 4.5 | 1.2 | 0.45 | 0.45 | 0.2 | <0.10 | | |
| D | 19.0 | 1.0 | 1.0 | | | | 1.0 | | |
| E | 17 | | | 5 | | | | | 1 |

Figure 10:
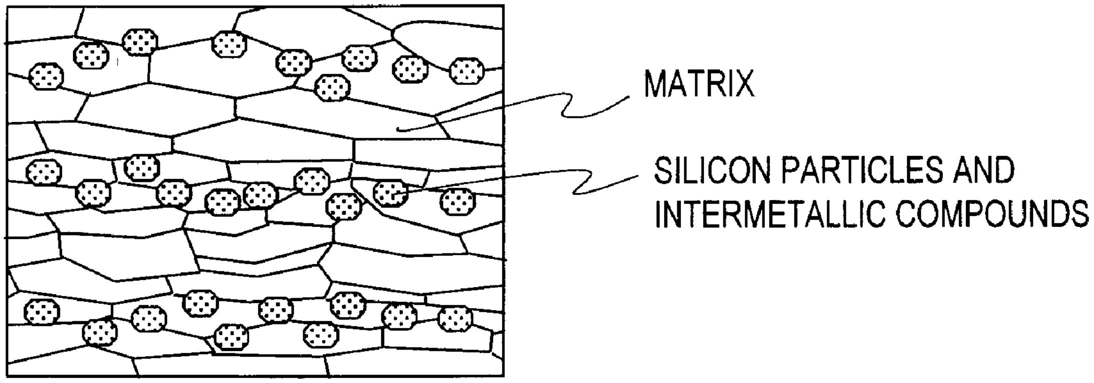
FIG. 10 illustrates a metal structure with fiber flows on a larger scale.

The metal structure that the workpiece 11 will eventually have as a result of the manufacturing process is determined by a forging process. Specifically, in the resultant metal structure, silicon particles and various intermetallic compounds are dispersed on a matrix in which aluminum and additive elements form a solid solution. The matrix includes either isometric crystals or dendritic crystals. Also, the silicon particles are either granular or flake-like, while the intermetallic compounds are granular or needle-like. It should be noted that in the material that has been simply forged, no fiber flows are seen to extend in a particular direction. As the matrix is stretched in the plastic deformation direction and as the silicon particles and intermetallic compounds are aligned with the plastic deformation direction, the fiber flows such as those shown on a larger scale in FIG. 10 are formed.

The workpiece 11 may be formed by performing either a continuous casting process or a hot extrusion process on the forged ingot at a temperature of about 400° C., for example. The workpiece 11 is a bar member (typically a round bar member) that has been formed by the continuous casting process or the extrusion process. If the extrusion process is adopted, a workpiece 11 with fiber flows that extend parallel to the direction in which the material is extruded can be obtained.

As described above, the present invention is also applicable to a forged piston made of a magnesium alloy or a titanium alloy. As the magnesium alloy, one of Magnesium Alloys F, G and H having the compositions shown in the following Table 2 may be used, for example. Meanwhile, as the titanium alloy, one of Titanium Alloys I and J having the compositions shown in the following Table 3 may be used, for example. All numerals in Tables 2 and 3 represent mass percentages and the balance of the alloy is magnesium in Table 2 and titanium in Table 3.

TABLE 2

| Magnesium alloy | Al | Zn | Mn | Fe | Si | Cu | Ni | Ca | Balance |
|---|---|---|---|---|---|---|---|---|---|
| F | 2.5-3.5 | 0.5-1.5 | >0.15 | <0.010 | <0.10 | <0.10 | <0.005 | <0.04 | <0.30 |
| G | 5.5-7.2 | 0.5-1.5 | 0.15-0.40 | <0.010 | <0.10 | <0.10 | <0.005 | | <0.30 |
| H | 7.5-9.2 | 0.2-1.0 | 0.10-0.40 | <0.010 | <0.10 | <0.05 | <0.005 | | <0.30 |

TABLE 3

| Titanium alloy | Al | V | Fe | O | C | N | H | Others Each | Others Total |
|---|---|---|---|---|---|---|---|---|---|
| I | 5.50-6.75 | 3.50-4.50 | <0.30 | <0.20 | <0.10 | <0.05 | <0.0125 | <0.10 | <0.40 |
| J | 5.50-6.50 | 3.50-4.50 | <0.25 | <0.13 | <0.08 | <0.05 | <0.0125 | <0.10 | <0.40 |

Figure 9B:
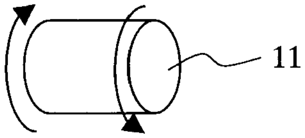
Figure 11:
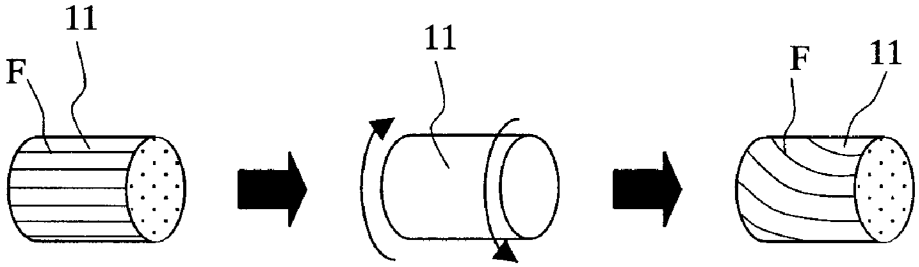
FIG. 11 illustrates how fiber flows are twisted by a twisting process.

Next, as shown in FIG. 9B, the workpiece 11 is twisted. As a result of this twisting process, the fiber flows F of the workpiece 11 can also be twisted as schematically shown in FIG. 11. The following Table 4 shows exemplary conditions of the twisting process. As shown in Table 4, the twisting process is preferably performed as a hot process (typically at a temperature of about 200° C. to about 500° C., for example). The conditions of the twisting process are naturally not limited to those shown in Table 4. The twisting process may be carried out with an electrohydraulic servo system torsion tester, for example.

TABLE 4

| | | |
|---|---|---|
| Dimensions (mm) | Outside diameter | φ40 |
| | Length | 200 |
| Temperature | | 200° C. to 500° C. |
| Number of times of twists | | 20 |

Figure 9C:
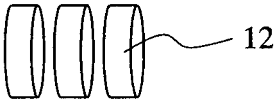

Subsequently, as shown in FIG. 9C, the workpiece 11 is cut and divided into a number of smaller workpieces 12, each having approximately the same size as the forged piston 10. For example, the round bar member 11 may be cut and divided into a plurality of disc-like billets 12 as shown in FIG. 9C.

Figure 9D:
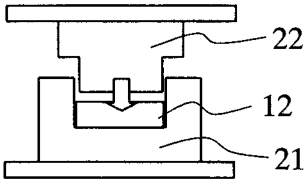
Figure 9E:
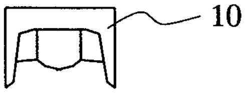

Thereafter, as shown in FIG. 9D, the workpiece (billet) 12 is forged with stress applied thereto in a predetermined direction (such as that pointed by the white arrow in FIG. 9D), thereby obtaining a forged piston 10 such as that shown in FIG. 9E. This forging process is preferably carried out as a hot process (at a temperature of about 200° C. to about 500° C., for example) by putting the workpiece (billet) 12 in a lower forging die 21 and then bringing an upper forging die 22 down. The direction in which the stress is applied in this forging process will be referred to herein as a "forging direction".

Figure 9F:
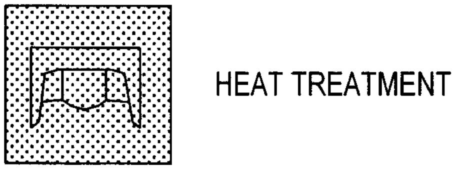

Subsequently, as shown in FIG. 9F, the forged piston 10 is thermally treated. Specifically, the forged piston 10 is subjected to a T6 or T7 heat treatment process to stabilize its dimensions and increase its strength. Each of these heat treatment processes includes a solution treatment and an aging treatment and may be conducted in the air. Their process conditions are preferably as follows:

Solution treatment: keep the piston heated at about 490° C. for approximately four hours and then cool it with water.

Aging treatment: keep the piston heated at about 200° C. for approximately four hours and then cool it with air.

Figure 9G:
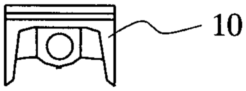

Finally, as shown in FIG. 9G, the forged piston 10 is subjected to a machining process, thereby cutting grooves to retain a compression ring or an oil ring and a hole to pass a piston pin (i.e., a piston pin hole). If necessary, the forged piston 10 may also be subjected to a surface treatment.

In the manufacturing process described above, the step of twisting the workpiece 11 is performed preferably before the forging process step. By performing this twisting process step, the fiber flows of the workpiece 11 can be made nonparallel to the forging direction (see FIG. 9D), and eventually the fiber flows F of the resultant forged piston 10 can be nonparallel to the radial direction and the sliding direction. In addition, the twisting process step can apply shear stress to the metal structure of the workpiece 11. Thus, the pores created in the workpiece 11 can be collapsed and excessively large crystal grains and needle-like crystals can be broken down into smaller crystals. As a result, the mechanical properties of the piston such as the deformability and the fatigue strength, among other things, can be improved.

In the twisting process step, the number of times of twists may be set according to the desired tilt angle of the fiber flows F. The greater the number of times of twists, the larger the tilt angle of the fiber flows F can be.

As described above, in the method of making a forged piston 10 according to this preferred embodiment, the step of working the workpiece 11 such that the fiber flows F of the workpiece 11 become nonparallel to the forging direction is carried out before the forging process step. As a result, a forged piston 10 with high strength and good fatigue endurance can be obtained.

If such a working process step were not performed before the forging process step, then the fiber flows f would be parallel to the radial direction and the sliding direction as shown in FIGS. 14A and 14B. In that case, the resultant forged piston might have insufficient strength or fatigue endurance (although enough for practically).

In the preferred embodiment described above, the bar member 11 is twisted. However, the twisting process step may be performed at any stage before the forging process step is carried out. That is to say, the twisting process step does not have to be carried out when the workpiece is a bar member 11. Alternatively, the twisting process step may also be performed when the workpiece is a billet 12, i.e., after the bar member 11 has been cut and divided into billets 12.

Figure 12:
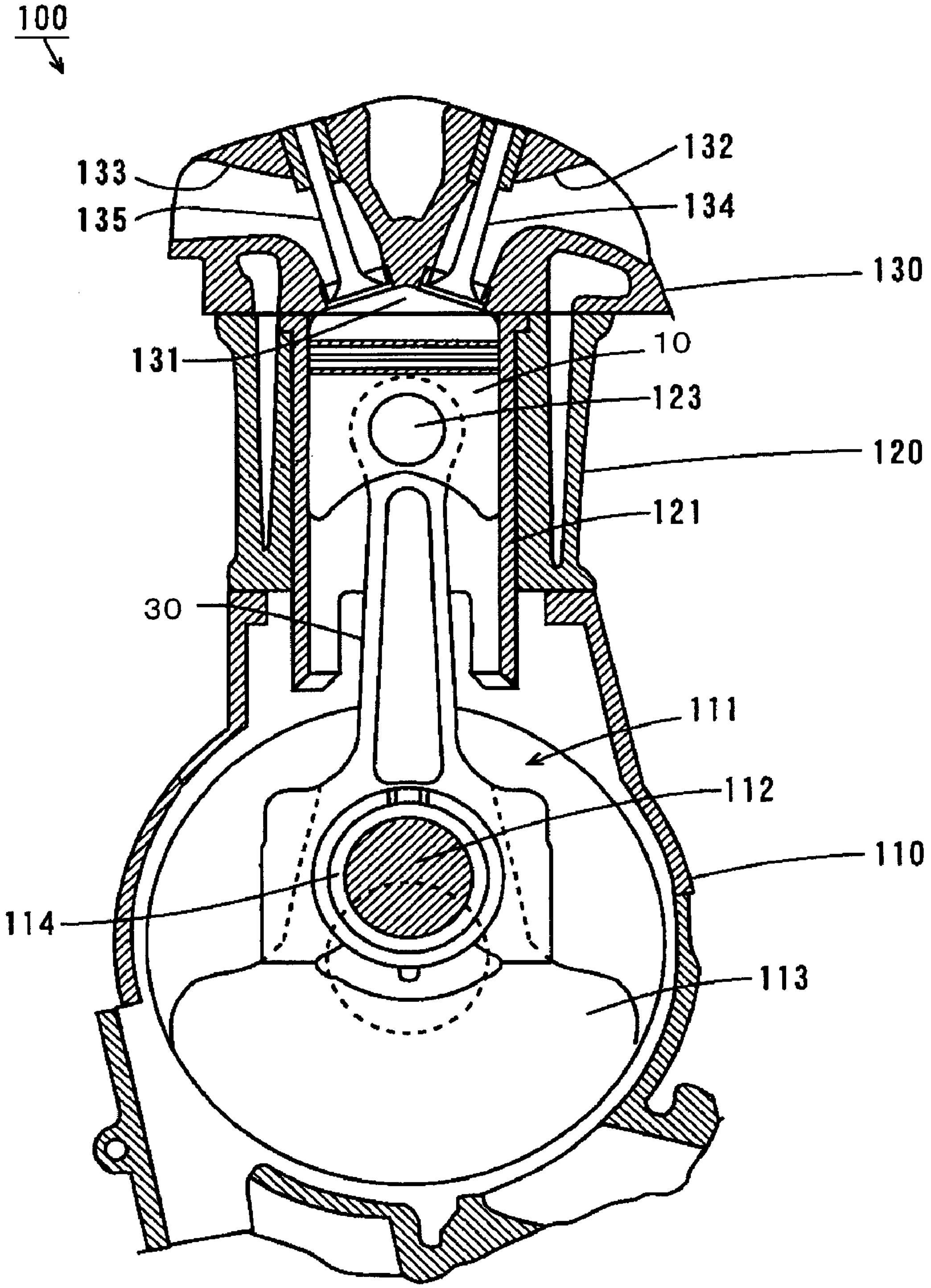
FIG. 12 is a cross-sectional view schematically illustrating an exemplary engine including a forged piston according to a preferred embodiment of the present invention.

The forged piston 10 of this preferred embodiment has high strength and good fatigue endurance as described above, and therefore, can be used extensively for internal combustion engines (which will be simply referred to herein as "engines") of automotive vehicles and various other transportation apparatuses. FIG. 12 shows an exemplary engine 100 including the forged piston 10 of this preferred embodiment.

The engine 100 includes a crankcase 110, a cylinder block 120 and a cylinder head 130.

A crankshaft 111 is stored in the crankcase 110 and includes a crank pin 112 and a crank web 113.

The cylinder block 120 is arranged over the crankcase 110. A cylindrical cylinder sleeve 121 has been fitted into the cylinder block 120 such that the forged piston 10 can reciprocate back and forth inside the cylinder sleeve 121.

The cylinder head 130 is arranged over the cylinder block 120. The cylinder head 130 and the forged piston 10 and the cylinder sleeve 121 of the cylinder block 120 together define a combustion chamber 131. The cylinder head 130 has an inlet port 132 and an outlet port 133. Inside the inlet port 132, an intake valve 134 is arranged to supply a mixed gas to the combustion chamber 131. On the other hand, inside the outlet port 133, an exhaust valve 135 is arranged to exhaust the gas out of the combustion chamber 131.

The forged piston 10 and the crankshaft 111 are coupled together with a connecting rod 30. More specifically, a piston pin 123 is inserted into a through hole at the small end of the connecting rod 30 and the crank pin 112 is inserted into a through hole at the big end of the rod 30, thereby coupling the piston 122 and the crank shaft 111 together. A bearing metal 114 is provided between the inner surface of the through hole at the big end and the crank pin 112.

The engine 100 shown in FIG. 12 includes the forged piston 10 of this preferred embodiment, and therefore, can have a lighter weight, a higher output and increased endurance.

Figure 13:
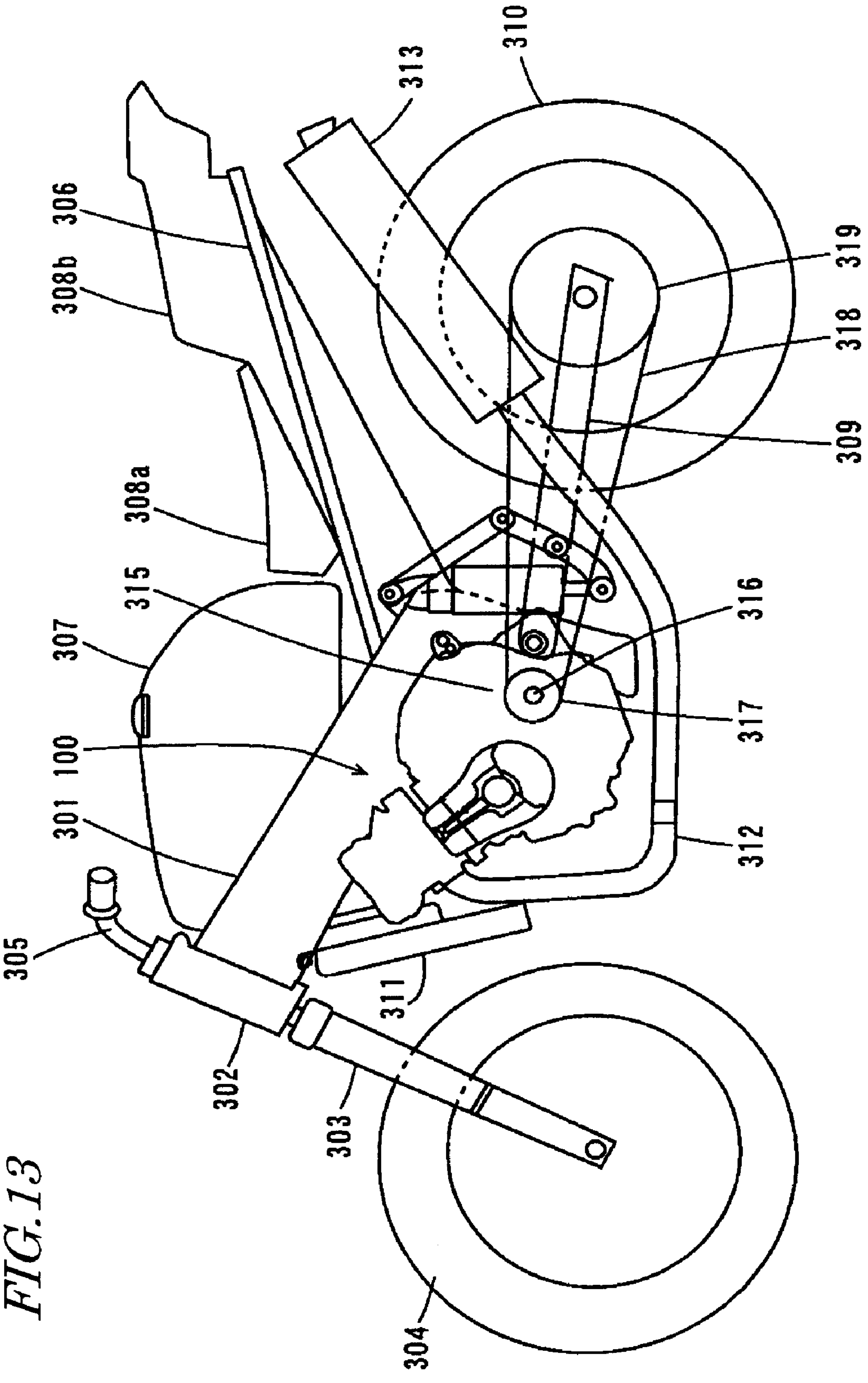
FIG. 13 is a cross-sectional view schematically illustrating a motorcycle equipped with the engine shown in FIG. 12.

FIG. 13 illustrates a motorcycle including the engine 100 shown in FIG. 12.

In the motorcycle shown in FIG. 13, a head pipe 302 is secured to the front end of a body frame 301 and a steering mechanism 305 is attached to the head pipe 302. A front fork 303 is attached to the head pipe 302 so as to freely swing to the right and to the left of the vehicle. A front wheel 304 is rotatably supported on the lower end of the front fork 303.

A seat rail 306 is attached to the body frame 301 so as to extend backward from the surface of the rear end of the body frame 301. A fuel tank 307 is mounted on the body frame 301. And a main seat 308*a* and a tandem seat 308*b* have been set up on the seat rail 306.

A rear arm 309 is attached to the rear end of the body frame 301 so as to extend backward. And a rear wheel 310 is rotatably supported on the rear end of the rear arm 309.

The engine 100 shown in FIG. 11, including the forged piston 10 of this preferred embodiment, is arranged at the center of the body frame 301. A radiator 311 is provided in front of the engine 100. An exhaust pipe 312 is connected to the outlet port of the engine 100. And a muffler 313 is attached to the rear end of the exhaust pipe 312.

A gearbox 315 is coupled to the engine 100. A drive sprocket 317 is attached to the output shaft 316 of the gearbox 315 and is coupled to the rear wheel sprocket 319 of the rear wheel 310 by way of a chain 318. The gearbox 315 and the chain 318 function as a transmission mechanism to transmit the power, generated by the engine 100, to the driving wheel.

The motorcycle shown in FIG. 13 includes the engine 100 with the forged piston 10 of this preferred embodiment, and therefore, realizes excellent performance.

The present invention provides a forged piston with higher strength and fatigue endurance than conventional ones and a method of making such a piston.

The forged piston of the present invention has such high strength and fatigue endurance that is can be used effectively in the internal combustion engines of passenger cars, buses, trucks, motorcycles, tractors, airplanes, motorboats, civil engineering vehicles and various other types of transportation apparatuses.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2006-192870 filed on Jul. 13, 2006, the entire contents of which are hereby incorporated by reference. Furthermore, the entire contents of Japanese Patent Application No. 2007-153509 filed on Jun. 11, 2007, are hereby incorporated by reference.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A forged piston made of an aluminum alloy, a magnesium alloy or a titanium alloy, wherein the piston includes:
- a piston head having fiber flows that are nonparallel to a radial direction as seen from a top view of the piston;
- a piston wall having fiber flows that are nonparallel to a sliding direction of the piston; and
- the fiber flows of the piston wall fall obliquely toward a lower portion of the piston wall and then rise obliquely toward an upper portion of the piston wall.

2. The forged piston of claim 1, wherein the fiber flows of the piston head have a swirling pattern.

3. An internal combustion engine comprising:
- a forged piston made of an aluminum alloy, a magnesium alloy or a titanium alloy, wherein the piston includes:
- a piston head having fiber flows that are nonparallel to a radial direction as seen from a top view of the piston;
- a piston wall having fiber flows that are nonparallel to a sliding direction of the piston; and
- the fiber flows of the piston wall fall obliquely toward a lower portion of the piston wall and then rise obliquely toward an upper portion of the piston wall.

4. A transportation apparatus comprising:
- an internal combustion engine including a forged piston made of an aluminum alloy, a magnesium alloy or a titanium alloy, wherein the piston includes:
  - a piston head having fiber flows that are nonparallel to a radial direction as seen from a top view of the piston;
  - a piston wall having fiber flows that are nonparallel to a sliding direction of the piston; and
  - the fiber flows of the piston wall fall obliquely toward a lower portion of the piston wall and then rise obliquely toward an upper portion of the piston wall.

5. A forged piston made of an aluminum alloy, a magnesium alloy or a titanium alloy, wherein the piston includes:
- a piston wall having fiber flows that are nonparallel to a sliding direction as seen from a side view of the piston; and
- the fiber flows fall obliquely toward a lower portion of the piston wall and then rise obliquely toward an upper portion of the piston wall.

6. An internal combustion engine comprising:
- a forged piston made of an aluminum alloy, a magnesium alloy or a titanium alloy, wherein the piston includes:
- a piston wall having fiber flows that are nonparallel to a sliding direction as seen from a side view of the piston; and
- the fiber flows fall obliquely toward a lower portion of the piston wall and then rise obliquely toward an upper portion of the piston wall.

7. A transportation apparatus comprising:
- an internal combustion engine including a forged piston made of an aluminum alloy, a magnesium alloy or a titanium alloy, wherein the piston includes:
  - a piston wall having fiber flows that are nonparallel to a sliding direction as seen from a side view of the piston; and
  - the fiber flows fall obliquely toward a lower portion of the piston wall and then rise obliquely toward an upper portion of the piston wall.

* * * * *